US010296539B2

(12) United States Patent
Tsutaoka

(10) Patent No.: US 10,296,539 B2
(45) Date of Patent: May 21, 2019

(54) IMAGE EXTRACTION SYSTEM, IMAGE EXTRACTION METHOD, IMAGE EXTRACTION PROGRAM, AND RECORDING MEDIUM STORING PROGRAM

(71) Applicant: FUJIFILM Corporation, Tokyo (JP)

(72) Inventor: Takuya Tsutaoka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 143 days.

(21) Appl. No.: 15/246,825

(22) Filed: Aug. 25, 2016

(65) Prior Publication Data

US 2017/0083545 A1  Mar. 23, 2017

(30) Foreign Application Priority Data

Sep. 18, 2015  (JP) ................................. 2015-185106

(51) Int. Cl.
*G06K 9/68* (2006.01)
*G06F 16/58* (2019.01)
*G06F 17/30* (2006.01)
*G06K 9/62* (2006.01)
*G06N 7/00* (2006.01)
*G06K 9/00* (2006.01)

(52) U.S. Cl.
CPC .... *G06F 16/5866* (2019.01); *G06F 17/30268* (2013.01); *G06K 9/00684* (2013.01); *G06K 9/628* (2013.01); *G06K 9/6221* (2013.01); *G06N 7/005* (2013.01)

(58) Field of Classification Search
None
See application file for complete search history.

(56) References Cited

U.S. PATENT DOCUMENTS 7,668,405 B2 * 2/2010 Gallagher ......... G06F 17/30244
382/305
8,024,343 B2 * 9/2011 Gallagher ......... G06F 17/30265
382/118

(Continued)

FOREIGN PATENT DOCUMENTS

JP    2006-259788 A    9/2006
JP    2007-025876 A    2/2007

(Continued)

OTHER PUBLICATIONS

Gallagher et al, Image Annotation Using Personal Calendars as Context, ACM Intl. Conf. on Multimedia 2008 (Year: 2008).*

(Continued)

*Primary Examiner* — Feng Niu
(74) *Attorney, Agent, or Firm* — Studebaker & Brackett PC

(57) ABSTRACT

There are provided an image extraction system, an image extraction method, and an image extraction program for extracting images valuable to a user and a recording medium storing the program. An image set including three or more images is classified into a plurality of clusters, and an annotation indicating a subject or a scene of each image is acquired from a plurality of images included in each cluster. Image co-occurrence probabilities in a plurality of images are calculated from the acquired annotations, and an image with an image co-occurrence probability equal to or less than a threshold value is extracted.

12 Claims, 16 Drawing Sheets

(56) References Cited

U.S. PATENT DOCUMENTS

| | | | | |
|---|---|---|---|---|
| 8,458,174 | B1* | 6/2013 | Duerig | G06F 17/30265 |
| | | | | 707/723 |
| 8,463,738 | B2* | 6/2013 | Mizuguchi | G06F 17/30657 |
| | | | | 707/602 |
| 8,634,662 | B2* | 1/2014 | Das | G06F 17/30265 |
| | | | | 382/225 |
| 8,705,866 | B2* | 4/2014 | Zhang | G06K 9/00684 |
| | | | | 382/159 |
| 8,811,755 | B2* | 8/2014 | Das | G06F 17/30265 |
| | | | | 382/225 |
| 8,855,430 | B1* | 10/2014 | Alldrin | G06F 17/30268 |
| | | | | 382/224 |
| 8,929,669 | B2 | 1/2015 | Yabu | |
| 8,938,449 | B1* | 1/2015 | Duerig | G06F 17/30265 |
| | | | | 707/723 |
| 9,367,814 | B1* | 6/2016 | Lewis | G06N 99/005 |
| 9,727,584 | B2* | 8/2017 | Alldrin | G06K 9/00664 |
| 9,946,783 | B1* | 4/2018 | Lewis | G06N 99/005 |
| 2010/0318525 | A1* | 12/2010 | Mizuguchi | G06F 17/30657 |
| | | | | 707/748 |
| 2011/0268323 | A1* | 11/2011 | Gallagher | G06F 17/30265 |
| | | | | 382/118 |
| 2012/0039527 | A1* | 2/2012 | Qi | G06K 9/4676 |
| | | | | 382/159 |
| 2015/0169641 | A1* | 6/2015 | Alldrin | G06K 9/00664 |
| | | | | 707/750 |

FOREIGN PATENT DOCUMENTS

| | | |
|---|---|---|
| JP | 2009-223764 A | 10/2009 |
| JP | 2014-014858 A | 1/2014 |
| JP | 5727476 B2 | 6/2015 |
| JP | 2015118522 A | 6/2015 |
| WO | 2015093385 A1 | 6/2015 |

OTHER PUBLICATIONS

Das et al, Event Classification in Personal Image Collections, IEEE Intl. Workshop on Media Information Analaysis for Personal and Social Applications at ICME 2009 (Year: 2009).*

Pierre Sermanet et al. "OverFeat: Integrated Recognition, Localization and Detection using Convolutional Networks", ICLR, 2014.

Jan Pelleg et al. "X-means: Extending K-means with Efficient Estimation of the Number of Clusters", Proceedings of the Seventeenth International Conference on Machine Learning, 2000.

* cited by examiner

IMAGE 1

IMAGE 2

IMAGE 3

IMAGE 4

IMAGE 5

IMAGE 6

IMAGE 7

IMAGE 8

IMAGE 9

IMAGE 10

FIG. 5

CLUSTER C1

| IMAGE No. | ANNOTATION | IMAGE CO-OCCURRENCE PROBABILITY |
|---|---|---|
| 1 | PERSON, FOOD, INDOOR | 0.1 |
| 2 | DOG | 0.8 |
| 3 | DOG | 0.8 |
| 4 | DOG | 0.8 |
| 5 | DOG | 0.8 |
| 6 | DOG | 0.8 |
| 7 | DOG | 0.8 |
| 8 | PERSON | 0.1 |
| 9 | DOG | 0.8 |
| 10 | DOG | 0.8 |

FIG. 6

CLUSTER C1

| IMAGE No. | ANNOTATION | IMAGE CO-OCCURRENCE PROBABILITY |
|---|---|---|
| 1 | PERSON, FOOD, INDOOR | 0.1 (0.2×0.1×0.1=0.002) |
| 2 | DOG | 0.8 |
| 3 | DOG | 0.8 |
| 4 | DOG | 0.8 |
| 5 | DOG | 0.8 |
| 6 | DOG | 0.8 |
| 7 | DOG | 0.8 |
| 8 | PERSON | 0.2 |
| 9 | DOG | 0.8 |
| 10 | DOG | 0.8 |

FIG. 8

CLUSTER C1

| IMAGE No. | ANNOTATION | IMAGE CO-OCCURRENCE PROBABILITY | 1 − IMAGE CO-OCCURRENCE PROBABILITY (IMAGE EVALUATION VALUE) | IMAGE QUALITY EVALUATION VALUE | IMAGE EVALUATION VALUE (AFTER CORRECTION) |
|---|---|---|---|---|---|
| 1 | PERSON, FOOD, INDOOR | 0.1 | 0.9 | 0.2 | 0.18 |
| 2 | DOG | 0.8 | 0.2 | 0.6 | 0.12 |
| 3 | DOG | 0.8 | 0.2 | 0.5 | 0.10 |
| 4 | DOG | 0.8 | 0.2 | 0.7 | 0.14 |
| 5 | DOG | 0.8 | 0.2 | 0.6 | 0.12 |
| 6 | DOG | 0.8 | 0.2 | 0.5 | 0.10 |
| 7 | DOG | 0.8 | 0.2 | 0.8 | 0.16 |
| 8 | PERSON | 0.1 | 0.9 | 0.3 | 0.27 |
| 9 | DOG | 0.8 | 0.2 | 0.5 | 0.10 |
| 10 | DOG | 0.8 | 0.2 | 0.7 | 0.14 |

FIG. 10

CLUSTER C2

| IMAGE No. | ANNOTATION | ANNOTATION OCCURRENCE PROBABILITY | | |
|---|---|---|---|---|
| | | PERSON | INDOOR | DOG |
| IMAGE 11 | PERSON, INDOOR | 0.5 | 0.5 | 0 |
| IMAGE 12 | PERSON | 1.0 | 0 | 0 |
| IMAGE 13 | DOG | 0 | 0 | 1.0 |
| IMAGE 14 | DOG | 0 | 0 | 1.0 |
| IMAGE 15 | DOG | 0 | 0 | 1.0 |
| AVERAGE | — | 0.3 | 0.1 | 0.6 |

FIG. 11

| IMAGE No. | COSINE VALUE | COSINE DISTANCE |
|---|---|---|
| IMAGE 11 | 0.4170 | 0.5830 |
| IMAGE 12 | 0.4423 | 0.5577 |
| IMAGE 13 | 0.8847 | 0.1153 |
| IMAGE 14 | 0.8847 | 0.1153 |
| IMAGE 15 | 0.8847 | 0.1153 |

| IMAGE No. | COSINE VALUE | COSINE DISTANCE | IMAGE QUALITY EVALUATION VALUE | IMAGE EVALUATION VALUE (AFTER CORRECTION) |
|---|---|---|---|---|
| IMAGE 11 | 0.4170 | 0.5830 | 0.3 | 0.1749 |
| IMAGE 12 | 0.4423 | 0.5577 | 0.3 | 0.1673 |
| IMAGE 13 | 0.8847 | 0.1153 | 0.6 | 0.0692 |
| IMAGE 14 | 0.8847 | 0.1153 | 0.6 | 0.0692 |
| IMAGE 15 | 0.8847 | 0.1153 | 0.6 | 0.0692 |

FIG. 17

IMAGE SET

| CLUSTER | IMAGE No. | ANNOTATION | IMAGE CO-OCCURRENCE PROBABILITY |
|---|---|---|---|
| CLUSTER 1 | 1 | PERSON, FOOD, INDOOR | 0.05 |
| | 2 | DOG | 0.6 |
| | 3 | DOG | 0.6 |
| | 4 | DOG | 0.6 |
| | 5 | DOG | 0.6 |
| | 6 | DOG | 0.6 |
| | 7 | DOG | 0.6 |
| | 8 | PERSON | 0.3 |
| | 9 | DOG | 0.6 |
| | 10 | DOG | 0.6 |
| CLUSTER 2 | 11 | PERSON, INDOOR | 0.05 |
| | 12 | PERSON | 0.3 |
| | 13 | DOG | 0.6 |
| | 14 | DOG | 0.6 |
| | 15 | DOG | 0.6 |
| CLUSTER 3 | 16 | PERSON | 0.3 |
| | 17 | PERSON | 0.3 |
| | 18 | PERSON | 0.3 |
| | 19 | DOG | 0.6 |
| | 20 | PERSON | 0.3 |

FIG. 18

CLUSTER C2

| IMAGE No. | ANNOTATION | IMAGE CO-OCCURRENCE PROBABILITY |
|---|---|---|
| 11 | PERSON, INDOOR | 0.2 |
| 12 | PERSON | 0.2 |
| 13 | DOG | 0.6 |
| 14 | DOG | 0.6 |
| 15 | DOG | 0.6 |

FIG. 19

CLUSTER C3

| IMAGE No. | ANNOTATION | IMAGE CO-OCCURRENCE PROBABILITY |
|---|---|---|
| 16 | PERSON | 0.8 |
| 17 | PERSON | 0.8 |
| 18 | PERSON | 0.8 |
| 19 | DOG | 0.2 |
| 20 | PERSON | 0.8 |

IMAGE EXTRACTION SYSTEM, IMAGE EXTRACTION METHOD, IMAGE EXTRACTION PROGRAM, AND RECORDING MEDIUM STORING PROGRAM

CROSS-REFERENCE TO RELATED APPLICATIONS

The present application claims priority under 35 U.S.C. § 119 to Japanese Patent Application No. 2015-185106, filed on Sep. 18, 2015, all of which are hereby expressly incorporated by reference into the present application.

BACKGROUND OF THE INVENTION

1. Field of the Invention

The present invention relates to an image extraction system, an image extraction method, and a non-transitory computer readable recording medium storing the program.

2. Description of the Related Art

As users can feel free to capture images, users often own a number of images. In the case of generating an album, images to be put into the album may be selected using an image feature quantity, such as the position of a face, the brightness of a subject image, and the amount of shake of a subject image (JP2015-118522A). Since there are things, by which it is possible to recognize the types and positions of a plurality of subjects, in an image (Pierre Sermanet, David Eigen, Xiang Zhang, Michael Mathieu, Rob Fergus, Yann LeCun. "OverFeat: Integrated Recognition, Localization and Detection using Convolutional Networks", ICLR, 2014), it is possible to find images including a desired subject using such things. In addition, in order to organize a number of images, the number of clusters into which images are divided may be automatically determined (Dan Pelleg, Andrew Moore, "X-means: Extending K-means with Efficient Estimation of the Number of Clusters", Proceedings of the Seventeenth International Conference on Machine Learning, 2000). In addition, there is also image searching using the feature amount of an image (JP2014-14858A), performing automatic arrangement of an album from the number of sheets of a subject (JP2009-223764A), selecting a representative image from the number of images included in a category and the depth of the category (JP2007-25876A), performing determination as a more important image as the frequency of a captured person becomes higher (JP5727476B), and grouping pieces of image data and selecting an image recommended for printing from the grouped images (JP2006-259788A).

SUMMARY OF THE INVENTION

However, it is cumbersome for the user to organize a number of images, and it is difficult to find images valuable to the user among a number of images. A good-looking image is selected in JP2015-118522A, an image feature quantity is obtained for distinguishing from other images in JP2014-14858A, automatic placement of an album is performed by the user operation in JP2009-223764A, a high-quality image is selected from images present in a high-importance category in JP2007-25876A, and determination as a more important image is performed as the frequency of appearances of a person becomes higher in JP5727476B. In all of these cases, however, images valuable to the user are not necessarily found. In any event, in all of JP2015-118522A, JP2014-14858A, JP2009-223764A, JP2007-25876A, JP5727476B, Pierre Sermanet, David Eigen, Xiang Zhang, Michael Mathieu, Rob Fergus, Yann LeCun. "OverFeat: Integrated Recognition, Localization and Detection using Convolutional Networks", ICLR, 2014, and Dan Pelleg, Andrew Moore, "X-means: Extending K-means with Efficient Estimation of the Number of Clusters", Proceedings of the Seventeenth International Conference on Machine Learning, 2000, images valuable to the user may not be found.

It is an object of the invention to find images valuable to the user.

An image extraction system of the invention comprises: an annotation acquisition unit that acquires annotations, which are information specifying at least one of a subject present in each image or a scene of each image, from a plurality of images; an image co-occurrence probability calculation unit that calculates an image co-occurrence probability, which indicates a frequency of occurrence of at least one of a subject or a scene in each of the plurality of images, from the annotations of the images acquired by the annotation acquisition unit; and a first image extraction unit that extracts an image, of which the image co-occurrence probability is equal to or less than a threshold value, from the plurality of images.

The invention also provides an image extraction method suitable for the image extraction system. That is, this method includes: causing an annotation acquisition unit to acquire annotations, which are information specifying at least one of a subject present in each image or a scene of each image, from a plurality of images; causing an image co-occurrence probability calculation unit to calculate an image co-occurrence probability, which indicates a frequency of occurrence of at least one of a subject or a scene in each of the plurality of images, from the annotations of the images acquired by the annotation acquisition unit; and causing an image extraction unit to extract an image, the image co-occurrence probability of which is equal to or less than a threshold value, from the plurality of images.

The invention also provides a computer-readable program for controlling a computer of an image extraction system and a non-transitory computer readable recording medium storing the program.

The image extraction system described above may further comprise a first annotation occurrence probability calculation unit that calculates a probability of occurrence of each annotation in the plurality of images from the annotations of the images acquired by the annotation acquisition unit. In this case, the image co-occurrence probability calculation unit sets an annotation occurrence probability corresponding to an annotation given to each of the images as the image co-occurrence probability of each of the images, for example.

The image extraction system described above may further comprise: a second annotation occurrence probability calculation unit that calculates a probability of occurrence of each annotation in each image of the plurality of images from the annotations of the images acquired by the annotation acquisition unit; an average occurrence probability calculation unit that calculates an average probability of occurrence by averaging the probability of occurrence calculated by the second annotation occurrence probability calculation unit for each annotation for the plurality of images; and a co-occurrence probability output unit that outputs a difference between the average probability of occurrence calculated by the average occurrence probability calculation unit and the probability of occurrence calculated by the second annotation occurrence probability calculation unit as the image co-occurrence probability.

For example, the image co-occurrence probability calculation unit sets a product of annotation occurrence probabilities of each image as the image co-occurrence probability.

The image extraction system described above may further comprise an annotation invalidation unit that, in a case where an area of a subject specified by an annotation acquired by the annotation acquisition unit is equal to or less than a predetermined size, invalidates an annotation specifying a subject having the predetermined size or less.

The image extraction system described above may further comprise an image evaluation unit that gives a higher image evaluation value as the image co-occurrence probability calculated by the image co-occurrence probability calculation unit becomes lower.

The image extraction system described above may further comprise an image quality evaluation value acquisition unit that acquires an image quality evaluation value for each of the plurality of images and an image evaluation value correction unit that corrects the image evaluation value evaluated by the image evaluation unit so as to become lower as the image quality evaluation value acquired by the image quality evaluation value acquisition unit becomes lower.

The image extraction system described above may further comprise a second image extraction unit that extracts an image, the image evaluation value of which corrected by the image evaluation value correction unit is equal to or greater than a threshold value, from a plurality of images.

The image extraction system described above may further comprise a control unit that makes the annotation acquisition unit acquire annotations of images and the image co-occurrence probability calculation unit calculate an image co-occurrence probability for three or more images which include the plurality of images and the number of which is larger than the number of the plurality of images and a third image extraction unit that extracts an image having a value, which is obtained by adding up or integrating image co-occurrence probabilities calculated for three or more images and image co-occurrence probabilities calculated for the plurality of images for the same image and which is equal to or less than a threshold value, from the plurality of images.

According to the invention, annotations specifying at least one of a subject present in each image or a scene of each image are acquired from a plurality of images. From the acquired annotations, an image co-occurrence probability indicating the frequency of occurrence of at least one of a subject or a scene in each of the plurality of images is calculated. An image of which the calculated image co-occurrence probability is equal to or less than a threshold value is extracted from the plurality of images. The image co-occurrence probability becomes lower as the frequency of occurrence of at least one of a subject or a scene in each of the plurality of images becomes smaller. An image with a lower image co-occurrence probability is a more unusual image among the plurality of images. It is thought that the user has dared to capture an image of an unusual subject or scene since the user saw an unusual subject or scene when capturing a plurality of images. Since it is thought that such an image is valuable to the user, it is possible to find such an image.

BRIEF DESCRIPTION OF THE DRAWINGS

FIG. 5 is an annotation table of images included in a first cluster.

FIG. 6 is an annotation table of images included in the first cluster.

FIG. 8 is an annotation table of images included in the first cluster.

FIG. 10 is an annotation table of images included in a second cluster.

FIG. 11 is a table showing the relationship among images included in the second cluster, a cosine value, and the cosine distance of the average of annotation occurrence probabilities.

FIG. 17 is an annotation table of images included in an image set.

FIG. 18 is an annotation table of images included in the second cluster.

FIG. 19 is an annotation table of images included in a third cluster.

DESCRIPTION OF THE PREFERRED EMBODIMENTS

First Embodiment

Figure 1:
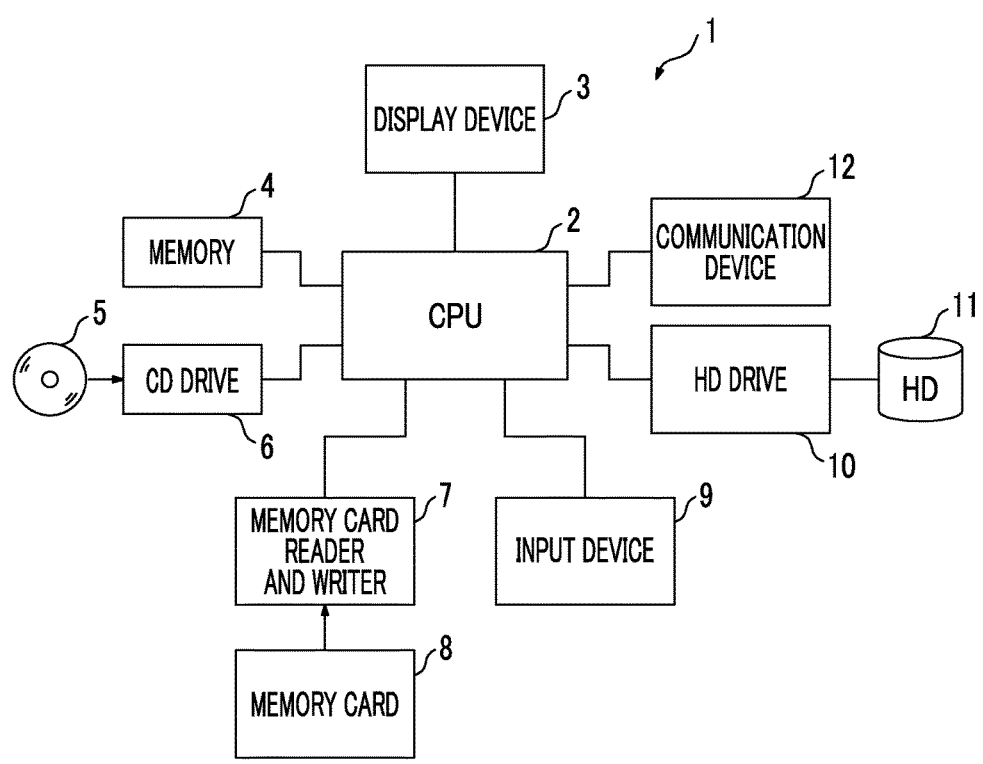
FIG. 1 is a block diagram showing the electrical configuration of an image extraction system.

FIG. 1 shows an embodiment of the invention, and is a block diagram showing the electrical configuration of an image extraction system 1.

The overall operation of the image extraction system 1 is controlled by a central processing unit (CPU) 2.

The image extraction system 1 includes a display device 3 that displays an extracted image or the like on the display screen, a memory 4 that stores data and the like, and a compact disk (CD) drive 6 for accessing the data and the like recorded in a compact disc 5. In addition, the image extraction system 1 includes a memory card reader and writer 7 that reads an image file from a memory card 8, in which image files indicating a number of images are stored, and records the image file in the memory card 8, and an input device 9 to give various commands to the image extraction system 1. In addition, the image extraction system 1 includes a hard disk 11, a hard disk (HD) drive 10 for accessing the hard disk 11, and a communication device 12 for communication with other computers or the like.

When the memory card 8 in which a number of image files (a plurality of image files) are stored is loaded into the image extraction system 1 and a number of images (image files) are read by the memory card reader and writer 7, images that are considered to be valuable to the user are extracted among a number of images that have been read. In a case where a number of images are stored in the compact disc 5 or other media without being limited to the memory card 8, images valuable to the user are extracted among a number of images stored in the medium. A reader suitable for reading the images stored in the medium is provided in the image extraction system 1. In a case where a number of images are provided to the image extraction system 1 through a network, such as the Internet, a number of images are received by the communication device 12, and the received images are stored in the memory 4. In this manner, images valuable to the user are extracted among a number of stored images.

A program for controlling a process to be described later, which is readable by a CPU 2 of the image extraction system 1, is stored in the compact disc 5. By loading the compact disc 5 into the image extraction system 1, the program stored in the compact disc 5 is installed in the image extraction system 1. The program may be transmitted through a network, such as the Internet. The program is received by the communication device 12, and the received program is installed in the image extraction system 1.

Figure 2:
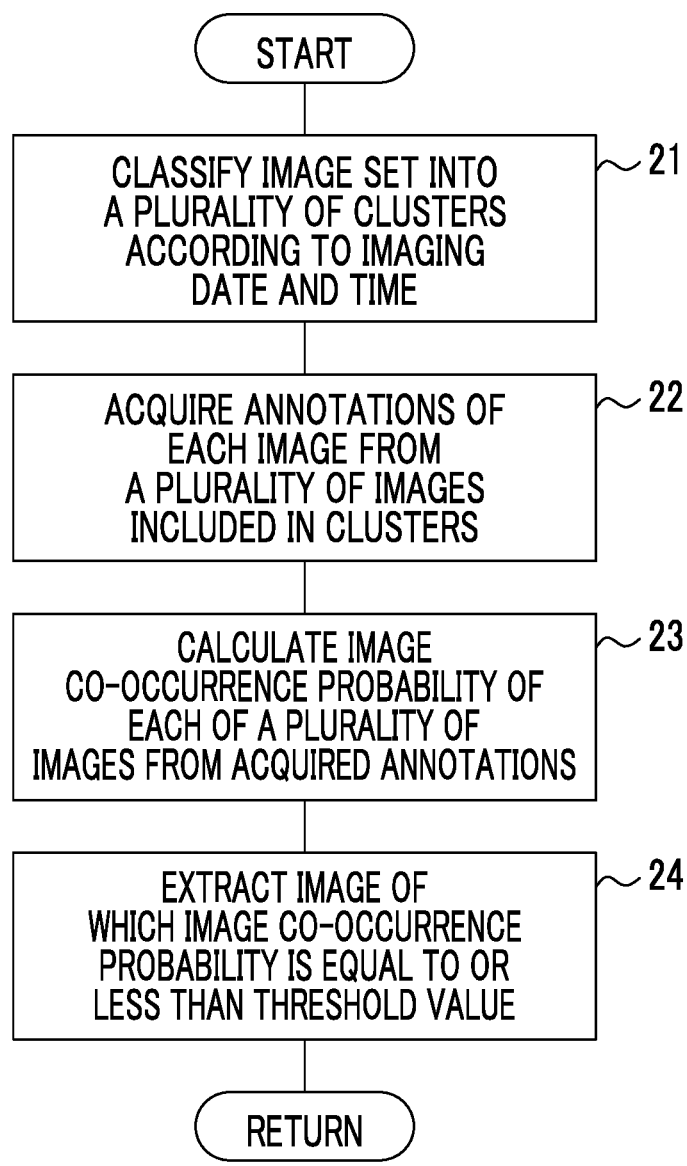
FIG. 2 is a flowchart showing the procedure of the image extraction system.

FIG. 2 is a flowchart showing the procedure of the image extraction system 1.

The memory card 8 in which a number of images are stored is loaded into the image extraction system 1 by the user, a number of images are read by the memory card reader and writer 7. A number of images that have been read are temporarily stored in the memory 4. The number of images is an image set, and the image set is classified into a plurality of clusters using the imaging date and time by the CPU 2 (step 21). Imaging date and time data is stored in the header of the image file, and the imaging date and time of an image is obtained from the imaging date and time data. In a case where no imaging date and time data is stored in the image file, a subject included in an image is recognized by image analysis, and the approximate imaging time can be estimated based on the content of the recognized subject. An image set does not necessarily need to be classified based on the imaging date and time, and may be classified into a plurality of clusters using other classification methods.

Figure 3:
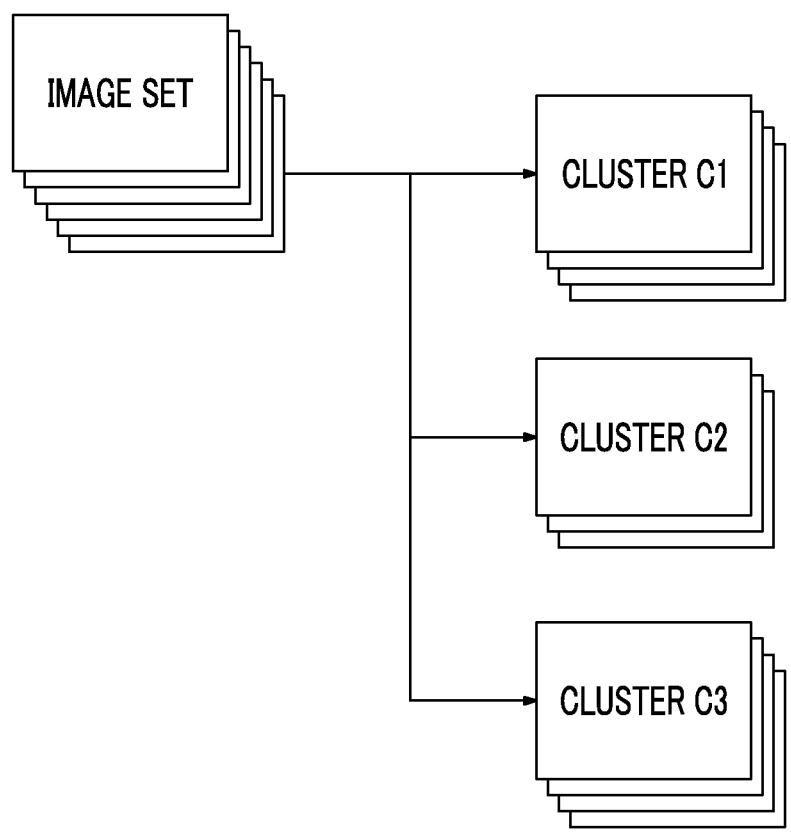
FIG. 3 shows how an image set is classified into a plurality of clusters.

FIG. 3 shows how an image set is classified into a plurality of clusters.

In the present embodiment, it is assumed that an image set is classified into a first cluster C1, a second cluster C2, and a third cluster C3. Needless to say, an image set may be classified into two clusters or four or more clusters. Instead of setting all images stored in the memory card 8 as an image set, images obtained by selecting some of a number of images stored in the memory card 8 may be set as an image set.

In the present embodiment, it is assumed that images valuable to the user are extracted from a plurality of images included in the first cluster C1.

Figure 4:
FIG. 4 is an example of a plurality of images.
Figure 4:
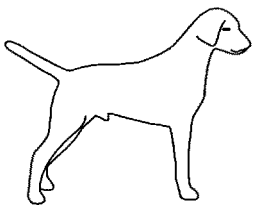
Figure 4:
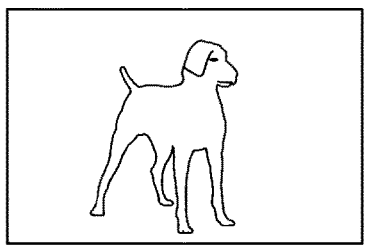
Figure 4:
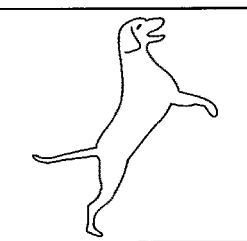
Figure 4:
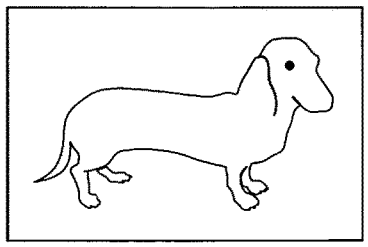
Figure 4:
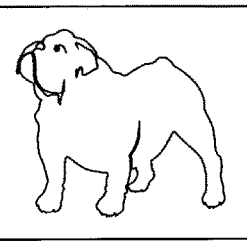
Figure 4:
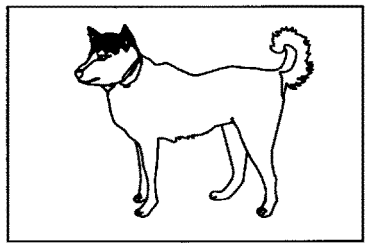
Figure 4:
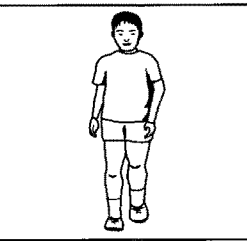
Figure 4:
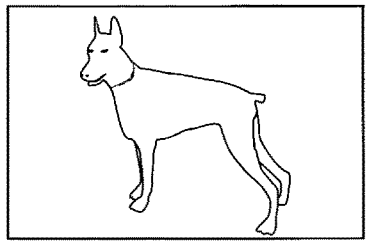
Figure 4:
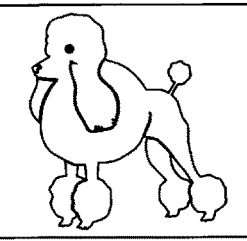

FIG. 4 shows ten images No. 1 to No. 10 included in the first cluster C1.

Subjects of the image No. 1 are a person and food, and the scene is indoor. The subject of the images No. 2 to No. 7, No. 9, and No. 10 is a dog. The subject of the image No. 8 is a person. A scene refers to words expressing the imaging situation, such as words showing the background of an image (for example, indoor, night view, and evening view) or words showing an event happening in the image (for example, a party, food, and an athletic meet).

The subject and the scene of an image are recorded in the header of the image file as annotations. Accordingly, from a plurality of images included in the first cluster C1, annotations that are information specifying at least one of a subject present in each image or a scene of each image are acquired by the CPU 2 (annotation acquisition unit) (step 22 in FIG. 2). Annotations do not necessarily need to be stored in the image file, and may be stored in a table or the like so as to be associated with an image. In such a case, annotations are read from the table. Annotations may also be acquired from an image by performing subject recognition, scene recognition, or the like by the CPU 2.

FIG. 5 is an example of an annotation table of the first cluster C1.

Since the subjects of the image No. 1 are a person and food, and the scene is indoor, person, food, and indoor are stored in the annotation table as the annotations. Since the subject of the images No. 2 to No. 7, No. 9, and No. 10 is a dog, dog is stored in the annotation table as the annotation. Since the subject of the image No. 8 is a person, person is stored in the annotation table as the annotation. The annotation table is generated by the CPU 2 and stored in the memory 4.

When annotations are acquired by the CPU 2, an image co-occurrence probability indicating the frequency of occurrence of at least one of the subject or the scene in each of the ten images (a plurality of images) included in the first cluster C1 is calculated from the acquired annotations of the image by the CPU 2 (image co-occurrence probability calculation unit) (step 23 in FIG. 2). The calculated image co-occurrence probability is stored in the annotation table shown in FIG. 5 by the CPU 2.

Referring to FIG. 5, annotations of the image No. 1 are person, food, and indoor, and an image having the annotation combination is only the image No. 1 among the ten images. Accordingly, the image co-occurrence probability is 1/10=0.1. The annotation of the images No. 2 to No. 7, No. 9, and No. 10 is dog. Accordingly, since images having the annotation combination are eight images among the ten images, the image co-occurrence probability is 8/10=0.8. The annotation of the image No. 8 is person. Accordingly, since an image having the annotation is one image among the ten images, the image co-occurrence probability is 1/10=0.1.

When the image co-occurrence probability is calculated, images of which the calculated image co-occurrence probability is equal to or less than a threshold value (for example, 0.3 or less), that is, the images No. 1 and No. 8, are extracted from the ten images (a plurality of images) by the CPU 2 (first image extraction unit) (step 24). The extracted images No. 1 and No. 8 are displayed on the display screen of the display device 3.

Since the extracted images No. 1 and No. 8 are unusual images in the first cluster C1, it is thought that the user has dared to image subjects to which special focus is given, such as a person and food, in the case of imaging a dog as a subject. Accordingly, it can be considered that images valuable to the user have been extracted.

Second Embodiment

FIG. 6 shows another embodiment, and shows another example of the annotation table.

In the present embodiment, the probability of occurrence of each annotation in a plurality (ten) of images is calculated from the annotations of an image by the CPU 2 (first annotation occurrence probability calculation unit). The probability of occurrence of each annotation corresponding to the annotation given to an image is the image co-occurrence probability of each image. For the probability of occurrence of each annotation, among annotations given to ten images included in the first cluster C1, the annotation of dog is given to the images No. 2 to No. 7, No. 9, and No. 10. That is, the annotation of dog is given to eight images among the ten images. Accordingly, the probability of occurrence of the annotation of dog is 0.8, and the probability of occurrence is the image co-occurrence probability of the images No. 2 to No. 7, No. 9, and No. 10. The annotation of person is given to the images No. 1 and No. 8. Accordingly, since the probability of occurrence of annotation is 0.2, the image co-occurrence probability of the image No. 8 is 0.2. For the image No. 1, the annotation of person, food, and indoor is given. Since the probability of occurrence of person is 0.2 and the annotation of each of food and indoor is given only to the image No. 1 among the ten images, the annotation of each of food and indoor is 0.1. In a case where a plurality of annotations (person, food, and indoor) are given in the same manner as for the image No. 1, the minimum probability of occurrence of each annotation of the plurality of annotations is the probability of occurrence of the annotation, and is the image co-occurrence probability of the image. In the case of the image No. 1, the annotation of food or indoor is the image co-occurrence probability of the image No. 1.

In the annotation table shown in FIG. 5, the image co-occurrence probability of the image No. 1 and the image co-occurrence probability of the image No. 8 are the same as 0.1. However, in the annotation table shown in FIG. 6, the image co-occurrence probability of the image No. 1 is 0.1, but the image co-occurrence probability of the image No. 8 is 0.2. Therefore, it can be determined that the image No. 1 is more valuable to the user than the image No. 8 is.

In addition, the product of annotation occurrence probabilities in each image may be set as the image co-occurrence probability.

The probability of occurrence of the annotation of person in the image No. 1 is 0.2, the probability of occurrence of the annotation of food in the image No. 1 is 0.1, and the probability of occurrence of the annotation of indoor in the image No. 1 is 0.1. Accordingly, the product of the probabilities of occurrence of these annotations is 0.2×0.1×0.1=0.002. This value is greatly different from the minimum probability of occurrence among the probabilities of occurrence of the annotations of person, food, and indoor. As a result, it is possible to find more unusual images, and these can be extracted as images valuable to the user.

Third Embodiment

Figure 7:
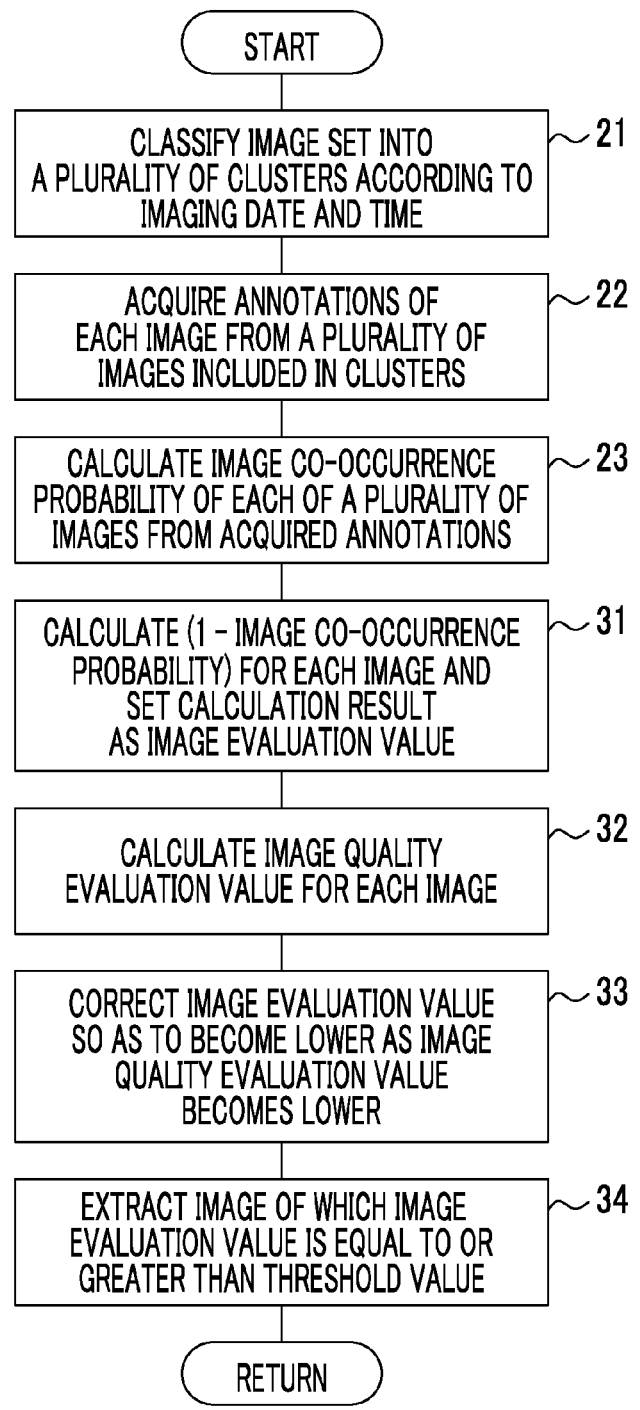
FIG. 7 is a flowchart showing the procedure of the image extraction system.

FIG. 7 shows another embodiment, and shows a flowchart showing the procedure of the image extraction system 1. Since the process shown in FIG. 7 corresponds to the process shown in FIG. 2, the same processing as the processing shown in FIG. 2 is denoted by the same reference numeral. FIG. 8 is an example of an annotation table of the first cluster C1.

An image set is classified into a plurality of clusters C1, C2, and C3 according to the imaging date and time (step 21), and the annotations of each image are acquired from a plurality of images included in the clusters by the CPU 2 (step 22). It is assumed that annotations for images included in the first cluster C1 are acquired. Annotations for images included in the other cluster C2 or C3 may be acquired. The image co-occurrence probability of each image in a plurality of images is calculated from the acquired annotations by the CPU 2 (step 23).

Annotations and image co-occurrence probabilities of the images No. 1 to No. 10 are acquired with reference to FIG. 8. The annotations and the image co-occurrence probabilities are the same as the annotations and the image co-occurrence probabilities of the images No. 1 to No. 10 included in the annotation table shown in FIG. 5. However, as shown in FIG. 6, the probability of occurrence of each annotation (or the product of the probabilities of occurrence of annotations) may be set as the image co-occurrence probability.

In the present embodiment, (1—image co-occurrence probability) is calculated for each image by the CPU 2 (step 31), and the value of the calculated (1—image co-occurrence probability) is stored in the annotation table. It is considered that an image is more valuable to the user as the value of the image co-occurrence probability becomes lower, but it is considered that an image is more valuable to the user as the value of (1—image co-occurrence probability) becomes higher. The value of (1—image co-occurrence probability) is an image evaluation value (step 31). Therefore, a higher image evaluation value is set by the CPU 2 (image evaluation unit) as the image co-occurrence probability becomes lower.

Subsequently, for each of the plurality of images No. 1 to No. 10 included in the first cluster C1, an image quality evaluation value is calculated by the CPU 2 (step 32). The image quality evaluation value is a value between 0 and 1 (does not necessarily need to be a value between 0 and 1), and the image quality evaluation value becomes a higher value as the image quality becomes higher. For the evaluation of image quality, a known method can be used. For example, it is possible to recognize a main subject and to give a higher evaluation value as the degree of blurring of the main subject becomes smaller (as the amount of high-frequency components becomes larger) or to give a higher evaluation value as the main subject is located closer to the center. The calculated image quality evaluation value is also stored in the annotation table by the CPU 2.

When the image quality evaluation value of each image is acquired by the CPU 2 (image quality evaluation value acquisition unit), the value of (1—image co-occurrence probability) of each image is multiplied by the image quality evaluation value by the CPU 2. Accordingly, the image evaluation value is corrected by the CPU 2 (image evaluation value correction unit), so that the image evaluation value expressed as (1—image co-occurrence probability) becomes lower as the image quality evaluation value becomes lower (step 33). In this manner, a corrected image evaluation value is obtained. An image of which the corrected image evaluation value is equal to or greater than a threshold value is extracted by the CPU 2 (second image extraction unit) (step 34).

For example, in a case where the threshold value is 0.2, only the image No. 8 has an image evaluation value equal to or greater than the threshold value of 0.2. Accordingly, the image No. 8 is extracted by the CPU 2. The image co-occurrence probability of the image No. 1 and the image co-occurrence probability of the image No. 8 are the same as 0.1, but the image quality evaluation value of the image No. 1 is 0.2 and the image quality evaluation value of the image No. 8 is 0.3. Accordingly, since the image evaluation value of the image No. 8 is higher than the image evaluation value of the image No. 1, the image No. 8 having a higher image quality between the images No. 1 and No. 8 having the same image co-occurrence probability is extracted.

In the embodiment shown in FIGS. 7 and 8, (1—image co-occurrence probability) is corrected by the image quality evaluation value. However, an image, of which the value of (1—image co-occurrence probability), which is an image evaluation value, is equal to or greater than the threshold value may be extracted without correcting (1—image co-occurrence probability) using the image quality evaluation value. In the case shown in FIG. 8, if the threshold value is 0.7, the images No. 1 and No. 8 are extracted.

Fourth Embodiment

Figure 9:
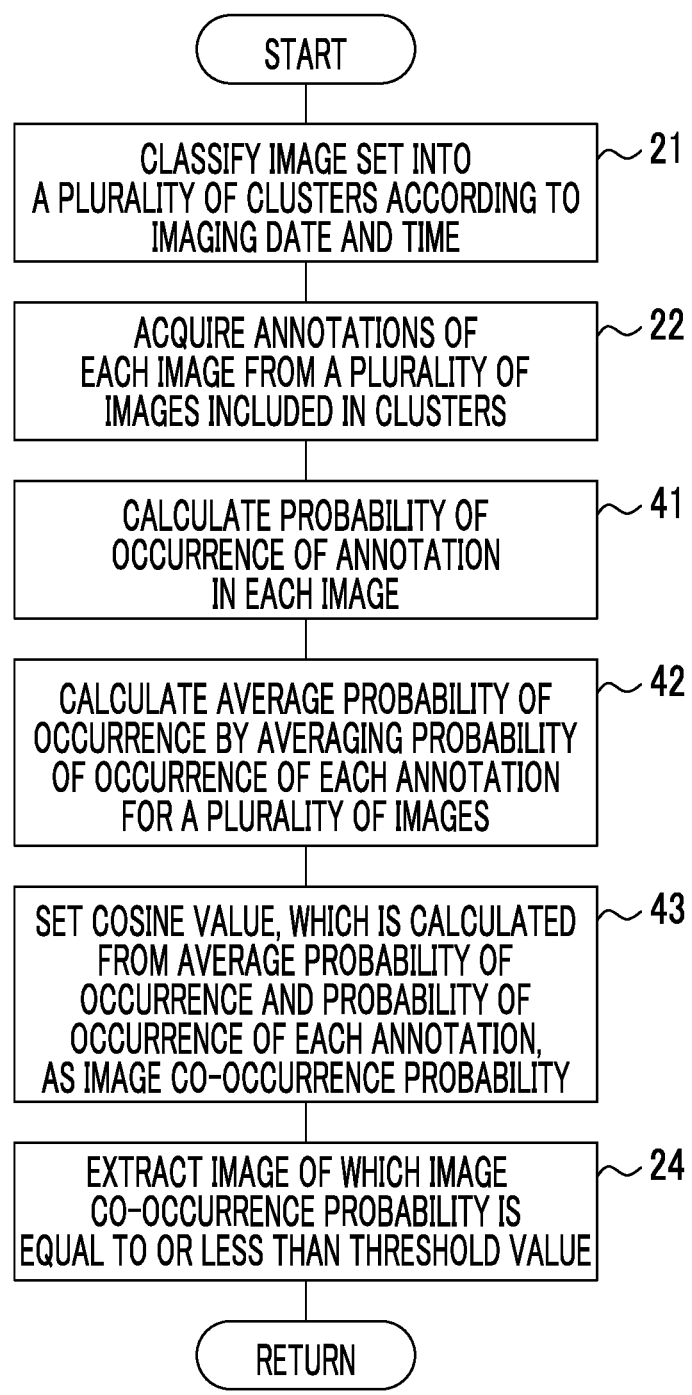
FIG. 9 is a flowchart showing the procedure of the image extraction system.

FIGS. 9 and 10 show still another embodiment. FIG. 9 is a flowchart showing the procedure of the image extraction system 1, and corresponds to FIG. 2. In the process shown in FIG. 9, the same processing as the processing shown in FIG. 2 is denoted by the same reference numeral. FIG. 10 shows an example of a annotation table of the second cluster C2. FIG. 11 is an example of a cosine value table that stores cosine values or the like of the image cluster C2.

In the present embodiment, it is assumed that an image is extracted from a plurality of images included in the second cluster C2. An image set is classified into a plurality of clusters C1, C2, and C3 according to the imaging date and time (step 21), and the annotations of each image are acquired from a plurality of images included in the second cluster C2 by the CPU 2 (step 22).

Five images of images No. 11 to No. 15 are assumed to be included in the second cluster C2. It is assumed that the annotations of person and indoor are acquired from the image No. 11, the annotation of person is acquired from the image No. 12, and the annotation of dog is acquired from each of the images No. 13, No. 14, and No. 15. As shown in FIG. 10, annotations corresponding to respective images are stored in the annotation table.

In the present embodiment, the probability of occurrence (Term Frequency value: TF value) of the annotation for each image is calculated by the CPU 2 (second annotation occurrence probability calculation unit) (step 41). For the image No. 11, the annotations of person and indoor are acquired, and the annotation of dog is not acquired. Accordingly, in the image No. 11, the annotation occurrence probability of person is 0.5, the annotation occurrence probability of indoor is 0.5, and the annotation occurrence probability of dog is 0. The annotation occurrence probabilities of person, indoor, and dog in the image No. 12 are 1.0, 0, and 0, respectively. The annotation occurrence probabilities of person, indoor, and dog in each of the images No. 13 to No. 15 are 0, 0, and 1.0, respectively.

Subsequently, the annotation occurrence probabilities of each image are averaged by the CPU 2 (average occurrence probability calculation unit) for each annotation for a plurality of images No. 11 to No. 15, so that an average probability of occurrence is calculated (step 42). The average probability of occurrence for the annotation of person is (0.5+1.0+0+0+0)/5=0.3, the average probability of occurrence for the annotation of indoor is (0.5+0+0+0+0)/5=0.1, and the average probability of occurrence for the annotation of dog is (0+0+1.0+1.0+1.0)/5=0.6.

In addition, a cosine value (cosine similarity) is calculated from the average probability of occurrence and the probability of occurrence (TF value) of the annotation in each image by the CPU 2. The cosine value is an image co-occurrence probability (step 43). The cosine value is a similarity calculation method that is used when comparing documents with each other in a vector space model. In this case, a similarity with an average image in a case where it is assumed that the annotation of the average probability of occurrence is given to an average image. For example, when each annotation occurrence probability in the image No. 11 is expressed in the vector space model, (person, indoor, dog) (0.5, 0.5, 0) is calculated using the probability of occurrence (FIG. 10) calculated in step 41 (FIG. 9). This can be similarly calculated for the images No. 12 to No. 15. In addition, when each annotation occurrence probability in the average image is expressed in the vector space model, (person, indoor, dog) (0.3, 0.1, 0.6) is calculated using the average probability of occurrence (FIG. 10) calculated in step 42 (FIG. 9). As a cosine value, it is preferable to calculate cos θ assuming that an angle between the annotation occurrence probability vector of each image and the annotation occurrence probability vector of the average image is θ. Cosine values of the images No. 11, No. 12, No. 13, No. 14, and No. 15 are 0.4170, 0.4423, 0.8847, 0.8847, and 0.8847, respectively. It is considered that an image is dissimilar to an average image in a cluster (in this case, the second cluster C2) to which the image belongs as the cosine value becomes low (θ becomes large).

Each cosine value is set as an image co-occurrence probability by the CPU 2 (step 43), and an image of which the image co-occurrence probability is equal to or less than a threshold value is extracted by the CPU 2 (step 24). For example, if the threshold value is 0.5, the images No. 11 and No. 12 are extracted from a plurality of images No. 11 to No. 15 of the second cluster C2. A cosine value shows a difference between the average probability of occurrence and the probability of occurrence of an annotation in each image, and is output from the CPU 2 (co-occurrence probability output unit). An image with a small cosine value is an image dissimilar to the average image of a plurality of images. Accordingly, since the image with a small cosine value is an unusual image among the plurality of images, the image with a small cosine value can be considered to be an image valuable to the user.

In FIG. 11, the average of annotation occurrence probabilities and a cosine distance are also stored. The cosine distance is a value obtained by subtracting the cosine value from 1. An image with a larger cosine distance has a larger dissimilarity from the average image of a plurality of images.

Fifth Embodiment

Figure 12:
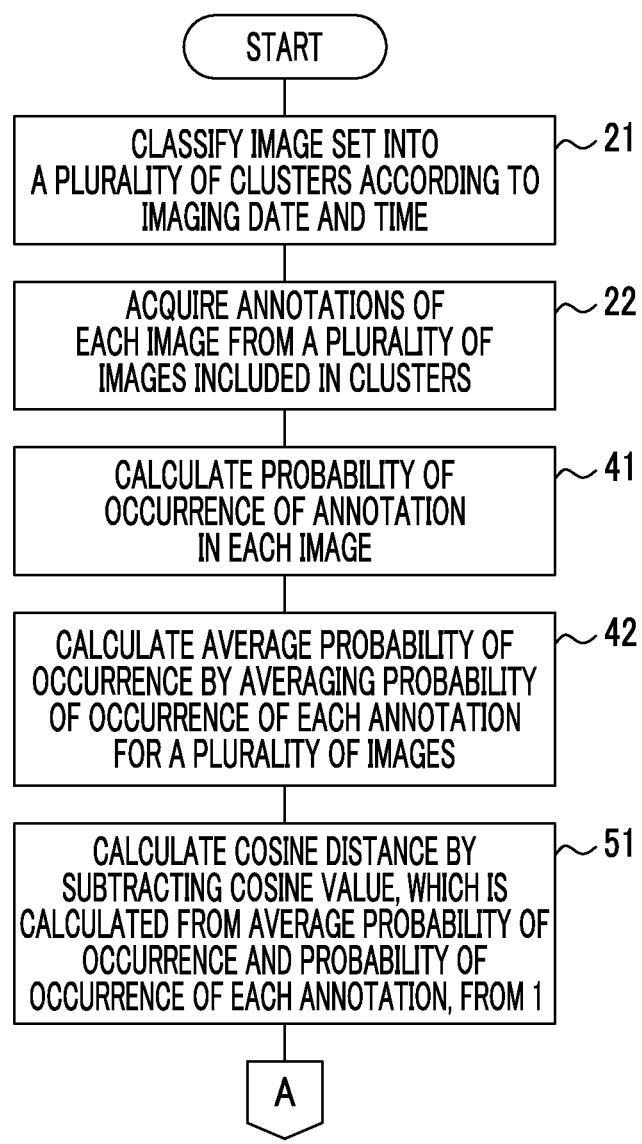
FIG. 12 is a flowchart showing the procedure of the image extraction system.
Figures 13, 14:
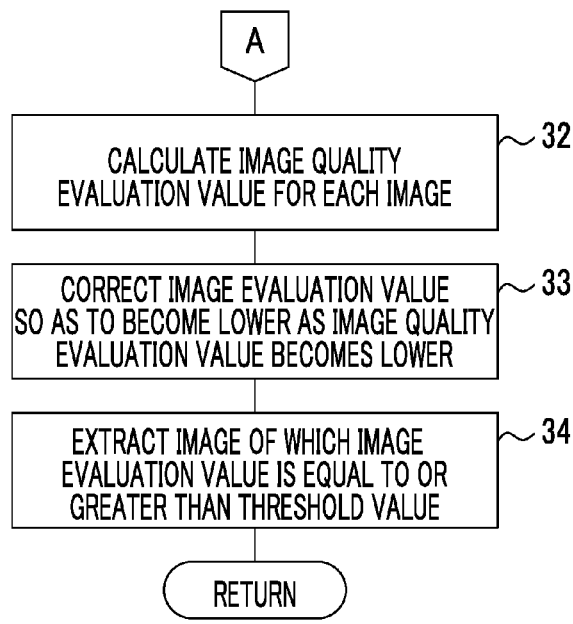
FIG. 13 is a flowchart showing the procedure of the image extraction system.
FIG. 14 is an image evaluation value table of images included in the second cluster.

FIGS. 12 to 14 show a modification of the embodiment shown in FIGS. 9 to 11. FIGS. 12 and 13 are flowcharts corresponding to the procedure of FIG. 9, and the same processing as the processing shown in FIG. 9 is denoted by the same reference numeral. FIG. 14 is an example of a cosine value table corresponding to FIG. 11.

Also in the present embodiment, an image is extracted from the images No. 11 to No. 15 included in the second cluster C2.

Referring to FIG. 12, an image set is classified into a plurality of clusters according to the imaging date and time (step 21), annotations of each image are acquired from the images No. 11 to No. 15 included in the second cluster C2 (step 22), and the probability of occurrence of each annotation in each image is calculated (step 41). Then, the probabilities of occurrence of each annotation for a plurality of images are averaged to calculate the average probability of occurrence (step 42). Since the same processing as in the fourth embodiment is performed up to now, an annotation table of the same values as in FIG. 10 is obtained.

The cosine value of each image is subtracted from 1 by the CPU 2, so that the cosine distance for each image is calculated (step 51). The cosine distance is an image evaluation value. Subsequently, an image quality evaluation value for each image is calculated (step 32), and the image evaluation value is corrected so as to become lower as the image quality evaluation value becomes lower by multiplying the cosine distance by the image quality evaluation value (step 33). An image of which the corrected image evaluation value is equal to or greater than a threshold value is extracted from the second cluster C2 as an image valuable to the user (step 34).

In the embodiment described above, the cosine distance is multiplied by the image evaluation value. However, since the cosine distance is also an image evaluation value, an image of which the cosine distance (image evaluation value) is equal to or greater than the threshold value may be extracted from the second cluster C2.

Sixth Embodiment

Figure 15:
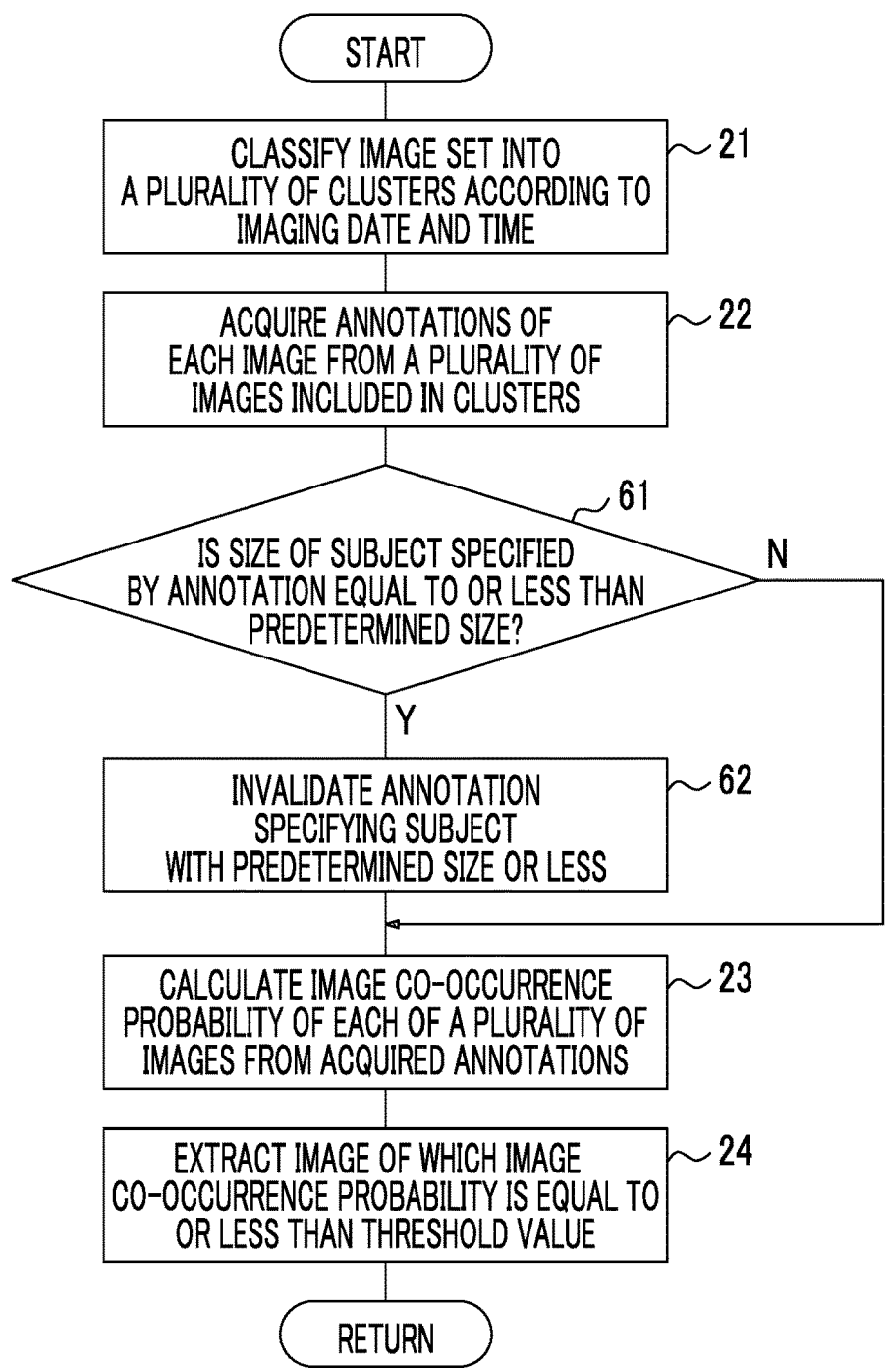
FIG. 15 is a flowchart showing the procedure of the image extraction system.

FIG. 15 shows still another embodiment, and shows a flowchart showing the procedure of the image extraction system 1. FIG. 15 corresponds to the flowchart shown in FIG. 2, and the same processing as the processing shown in FIG. 2 is denoted by the same reference numeral.

An image set is classified into a plurality of clusters C1, C2, and C3 according to the imaging date and time (step 21), and the annotations of each image are acquired from a plurality of images included in the clusters (step 22). In the present embodiment, the CPU 2 determines whether or not the size of a subject specified by an annotation is equal to or less than a predetermined size (whether or not the size of a subject with respect to the image is equal to or greater than a predetermined size) (step 61). Even in a case where the size of a subject included in the image is small, the annotation of the subject may be given to the image. It is thought that the user rarely focuses on such a subject at the time of imaging. However, since the probability of occurrence of an annotation may become low even for a small subject, an image including a subject on which the user does not focus may be extracted. In the present embodiment, therefore, in a case where there is a subject with a predetermined size or less (YES in step 61), an annotation indicating the subject is invalidated by the CPU 2 (annotation invalidation unit) (step 62). For a subject with a predetermined size or less, the processing of step 62 is skipped.

Thereafter, image co-occurrence probabilities in a plurality of images are calculated from annotations (step 23), and an image with an image co-occurrence probability equal to or less than the threshold value is extracted (step 24).

Seventh Embodiment

FIGS. 16 to 19 show still another embodiment. In the present embodiment, annotations for three or more images included in an image set are acquired to calculate an image co-occurrence probability.

Figure 16:
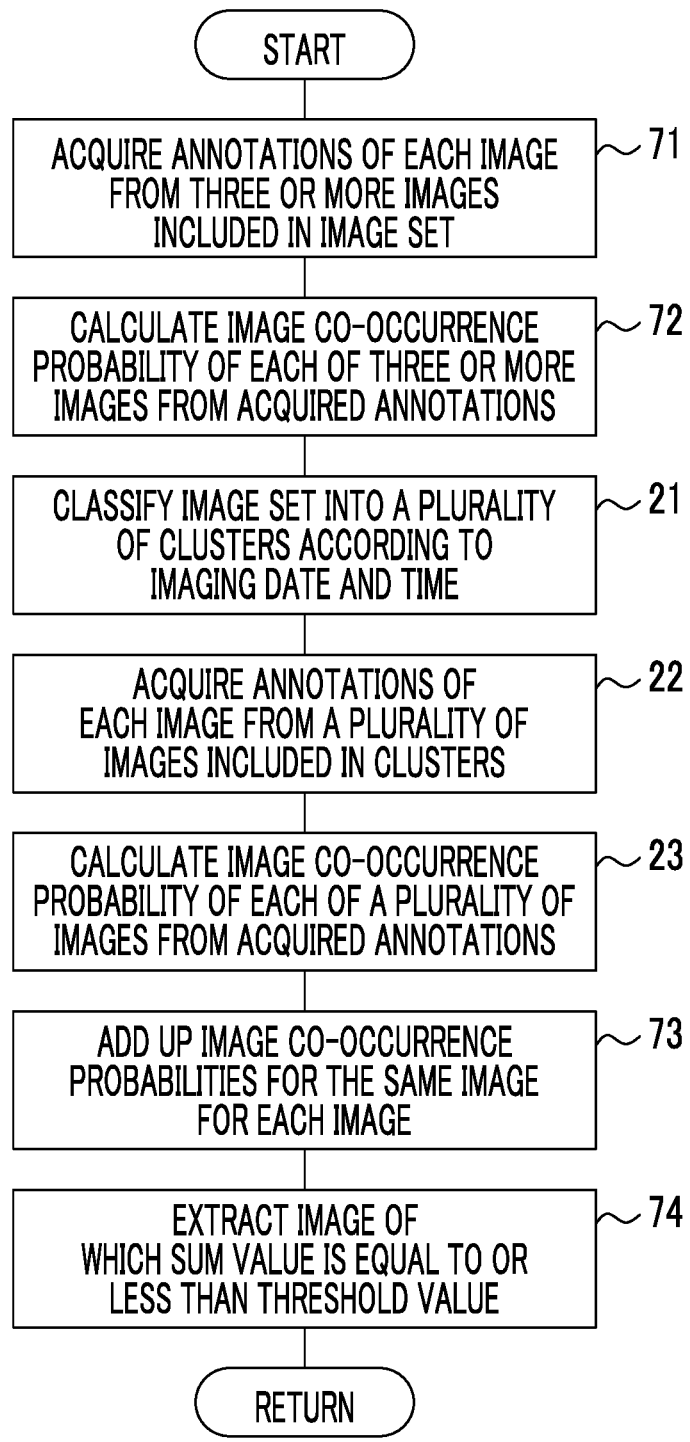
FIG. 16 is a flowchart showing the procedure of the image extraction system.

FIG. 16 is a flowchart showing the procedure of the image extraction system 1, and corresponds to the flowchart shown in FIG. 2. In FIG. 16, the same processing as the processing shown in FIG. 2 is denoted by the same reference numeral. FIGS. 17 to 19 are an example of the annotation table. FIG. 17 is an annotation table for three or more images included in an image set, FIG. 18 is an annotation table for a plurality of images included in the second cluster C2, and FIG. 19 is an annotation table for a plurality of images included in the third cluster C3.

Annotations of each image are acquired from three or more images included in the image set (all images included in the image set) by the CPU 2 (control unit) (step 71). It is assumed that the images No. 1 to No. 20 are included in the image set.

FIG. 17 is an example of the annotation table of an image set.

Annotations are obtained corresponding to images included in the image set. Among the images included in the image set, the images No. 1 to No. 10 are images included in the first cluster C1, the images No. 11 to No. 15 are images included in the second cluster C2, and the images No. 16 to No. 20 are images included in the third cluster C3.

Subsequently, image co-occurrence probabilities of three or more images included in the image set (all images included in the image set) are calculated from the acquired annotations by the CPU 2 (control unit) (step 72). Referring to FIG. 17, the annotation of the image No. 1 is an annotation of a set of person, food, and indoor, and an image having an annotation of such a set is only the image No. 1 among the twenty images of the images No. 1 to No. 20 included in the image set. Accordingly, the image co-occurrence probability is 1/20=0.05. Since the image co-occurrence probability of the image No. 1 calculated using the first cluster C1 is 0.1, the image co-occurrence probability becomes lower. The annotation of the images No. 2 to No. 7, No. 9, No. 10, No. 13 to No. 15, and No. 19 is dog. Accordingly, since the number of images having such an annotation of dog is 12, the image co-occurrence probability is 12/20=0.6. For the other images, the image co-occurrence probability is similarly calculated.

Referring back to FIG. 16, after the image co-occurrence probability of each image included in the image set is calculated, the images included in the image set are classified into a plurality of clusters (step 21). Specifically, the images included in the image set are classified into the first cluster C1, the second cluster C2, and the third cluster C3. Annotations for the respective images included in each of the first cluster C1, the second cluster C2, and the third cluster C3 after classification are acquired (step 22), and image co-occurrence probabilities in each cluster are calculated (step 23). As a result, an annotation table for the images No. 1 to No. 10 included in the first cluster C1 is obtained as shown in FIG. 5, an annotation table for the images No. 11 to No. 15 is obtained as shown in FIG. 18, and an annotation table for the images No. 16 to No. 20 is obtained as shown in FIG. 19.

Referring to FIG. 18, the annotation of the image No. 11 are person and indoor, and such an annotation is given to only the image No. 11 in the second cluster C2. The image co-occurrence probability of the image No. 11 in the second cluster C2 is 0.2. Similarly, the image co-occurrence probability of the image No. 12 is 0.2, and the image co-occurrence probability of each of the images No. 13 to No. 15 is 0.6.

Referring to FIG. 19, the annotation of the images No. 16 to No. 18 and No. 20 is person, and the annotation of the images No. 16 to No. 18 and No. 20 in the third cluster C3 is 0.8. Similarly, the co-occurrence probability of the image No. 19 in the third cluster C3 is 0.2.

If the image co-occurrence probability of each image in an image set and the image co-occurrence probability of each image in the image clusters C1, C2, and C3 are obtained, the image co-occurrence probability of each image in the image set and the image co-occurrence probability of each image in the image clusters C1, C2, and C3 are added up for the same image by the CPU 2, thereby obtaining a sum value (step 73). An integrated value may be obtained by integrating the image co-occurrence probabilities instead of addition.

An image of which the sum value or the integrated value is equal to or less than a threshold value is extracted from the image set by the CPU 2 (third image extraction unit) (step 74). Not only unusual images in each cluster but also unusual images in each image set can be extracted as images valuable to the user.

In any of the embodiments described above, as shown in FIG. 10, it is possible to calculate the annotation occurrence probability of each image, calculate the average probability of occurrence, calculate a cosine value or a cosine distance, and output the difference between the average probability of occurrence and the probability of occurrence of an annotation of each image. Alternatively, the product of the probabilities of occurrence of each image may be set as an image co-occurrence probability. In addition, an image quality evaluation value may be acquired, and the image evaluation value may be corrected so as to become lower as the image quality evaluation value becomes lower, or an image of which the image evaluation value is equal to or greater than a threshold value may be extracted from a plurality of images. In addition, the annotation occurrence probability of each image may be set as an image co-occurrence probability. In a case where a plurality of annotations are given to one image, the product of the probabilities of occurrence of the plurality of annotations may be set as the annotation occurrence probability of the image, or the minimum probability of occurrence among the probabilities of occurrence of the plurality of annotations may be set as the annotation occurrence probability of the image. In any of the embodiments, an annotation given to a subject with a predetermined size or less may be invalidated.

Not only may the probability of occurrence of an annotation be corrected by the image quality evaluation value, but also the probability of occurrence of an annotation may be corrected based on the position of a subject specified by the annotation, or according to whether or not the position of a subject specified by the annotation is located in front of other subjects, or according to whether or not the position of a subject specified by the annotation is blurred. For example, the probability of occurrence of an annotation may be corrected so as to be higher as a subject specified by the annotation is located closer to the center of the image. Alternatively, the probability of occurrence of an annotation may be corrected so as to become high in proportion to an extent that a subject specified by the annotation is located in front of other subjects, or the probability of occurrence of an annotation may be corrected so as to become low in proportion to the extent of blurring of a subject specified by the annotation.

What is claimed is:

1. An image extraction system, comprising:
   a processor configured to,
   acquire annotations, which are information specifying at least one of a subject present in each image or a scene of each image, from a plurality of images;
   calculate an image co-occurrence probability, which indicates a frequency of occurrence of at least one of a subject or a scene in each of the plurality of images, from the annotations of the plurality of images acquired by the processor;
   extract an image, the image co-occurrence probability of which is equal to or less than a threshold value, from the plurality of images;
   give a higher image evaluation value as the image co-occurrence probability calculated by the processor becomes lower;
   acquire an image quality evaluation value for each of the plurality of images; and
   correct the image evaluation value evaluated by the processor so as to become lower as the image quality evaluation value acquired by the processor becomes lower.

2. The image extraction system according to claim 1, the processor further configured to:
   calculate a probability of occurrence of each annotation in the plurality of images from the annotations of the images acquired by the processor,
   wherein the processor sets an annotation occurrence probability corresponding to an annotation given to each of the images as the image co-occurrence probability of each of the images.

3. The image extraction system according to claim 2, wherein the processor sets a product of annotation occurrence probabilities of each image as the image co-occurrence probability.

4. The image extraction system according to claim 3, the processor further configured to:
   in a case where an area of a subject specified by an annotation acquired by the processor is equal to or less than a predetermined size, invalidate an annotation specifying a subject having the predetermined size or less.

5. The image extraction system according to claim 2, the processor further configured to:
   in a case where an area of a subject specified by an annotation acquired by the processor is equal to or less than a predetermined size, invalidate an annotation specifying a subject having the predetermined size or less.

6. The image extraction system according to claim 1, the processor further configured to:
   extract an image, the image evaluation value of which is corrected by the processor is equal to or greater than a threshold value, from a plurality of images.

7. The image extraction system according to claim 1, the processor further configured to:
   calculate a probability of occurrence of each annotation in each image of the plurality of images from the annotations of the images acquired by the processor;
   calculate an average probability of occurrence by averaging the probability of occurrence calculated by the processor for each annotation for the plurality of images; and
   output a difference between the average probability of occurrence calculated by the processor and the probability of occurrence calculated by processor as the image co-occurrence probability.

8. The image extraction system according to claim 7, the processor further configured to:
   in a case where an area of a subject specified by an annotation acquired by the processor is equal to or less than a predetermined size, invalidate an annotation specifying a subject having the predetermined size or less.

9. The image extraction system according to claim 1, the processor further configured to:
   in a case where an area of a subject specified by an annotation acquired by the processor is equal to or less than a predetermined size, invalidate an annotation specifying a subject with the predetermined size or less.

10. The image extraction system according to claim 1, the processor further configured to:
acquire annotations of images and calculate an image co-occurrence probability for three or more images which include the plurality of images and the number of which is larger than the number of the plurality of images; and
extract an image having a value, which is obtained by adding up or integrating image co-occurrence probabilities calculated for three or more images and image co-occurrence probabilities calculated for the plurality of images for the same image and which is equal to or less than a threshold value, from the plurality of images.

11. An image extraction method, comprising:
causing an annotation acquisition unit to acquire annotations, which are information specifying at least one of a subject present in each image or a scene of each image, from a plurality of images;
causing an image co-occurrence probability calculation unit to calculate an image co-occurrence probability, which indicates a frequency of occurrence of at least one of a subject or a scene in each of the plurality of images, from the annotations of the plurality of images acquired by the annotation acquisition unit;
causing an image extraction unit to extract an image, the image co-occurrence probability of which is equal to or less than a threshold value, from the plurality of images;
causing an image evaluation unit to give a higher image evaluation value as the image co-occurrence probability calculated by the image co-occurrence probability calculation unit becomes lower;
causing an image quality evaluation value acquisition unit to acquire an image quality evaluation value for each of the plurality of images; and
causing an image evaluation value correction unit to correct the image evaluation value evaluated by the image evaluation unit so as to become lower as the image quality evaluation value acquired by the image quality evaluation value acquisition unit becomes lower.

12. A non-transitory computer readable recording medium storing a computer-readable program for controlling a computer of an image extraction system, causing the computer to execute:
acquiring annotations, which are information specifying at least one of a subject present in each image or a scene of each image, from a plurality of images;
calculating an image co-occurrence probability, which indicates a frequency of occurrence of at least one of a subject or a scene in each of the plurality of images, from the acquired annotations of the plurality of images;
extracting an image, the image co-occurrence probability of which is equal to or less than a threshold value, from the plurality of images;
giving a higher image evaluation value as the calculated image co-occurrence probability becomes lower;
acquiring an image quality evaluation value for each of the plurality of images; and
correcting the image evaluation value so as to become lower as the image quality evaluation value becomes lower.

* * * * *